July 20, 1965   V. H. FISCHER   3,195,533
DETECTING PHYSIOLOGICAL CONDITIONS BY MEASURING
BIOELECTRIC OUTPUT FREQUENCY
Filed April 26, 1963   2 Sheets-Sheet 1
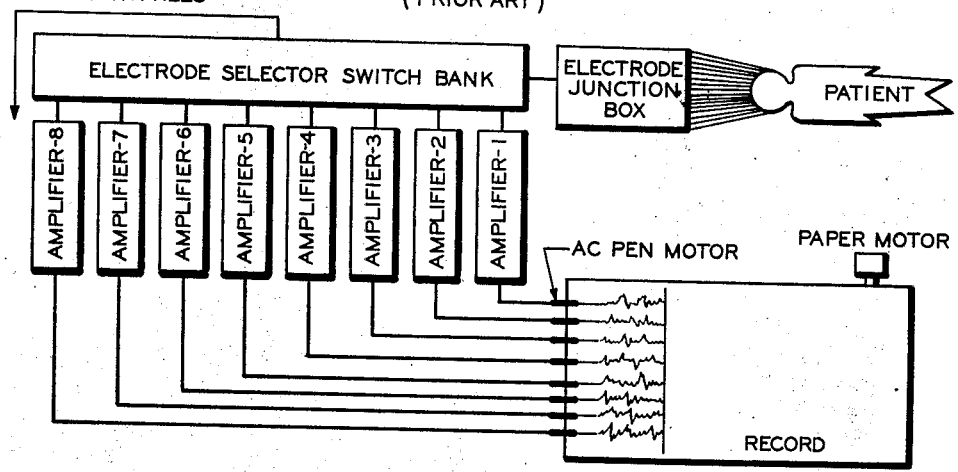
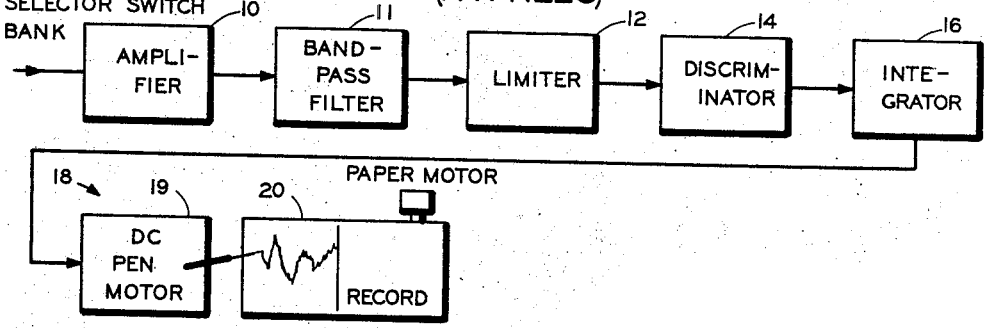
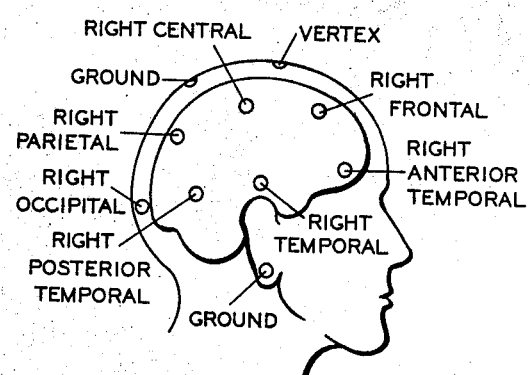
INVENTOR.
VICTOR H. FISCHER
BY *Gray, Mase*
*& Dunson*
ATTORNEYS

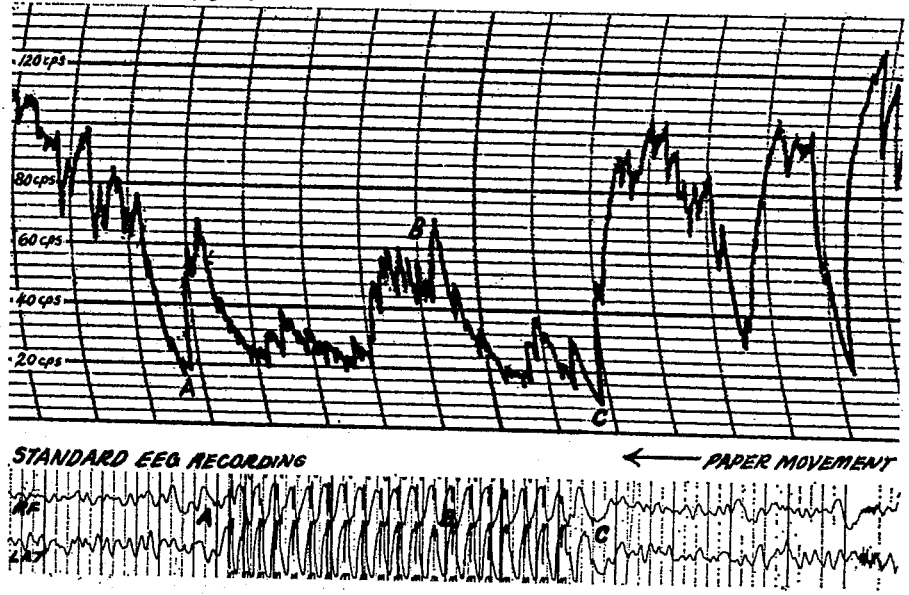
FIG. 4
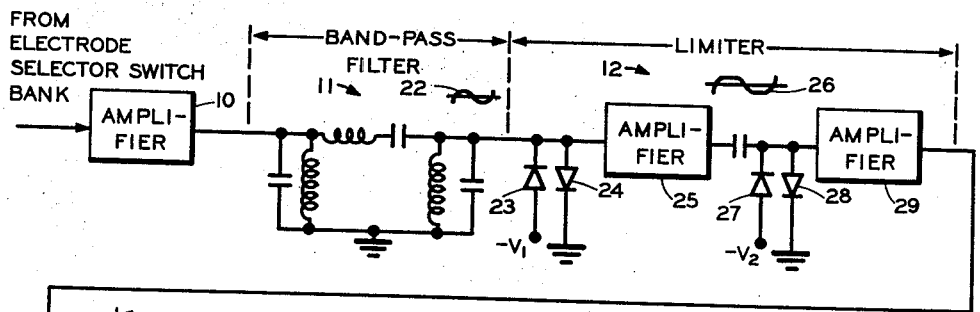
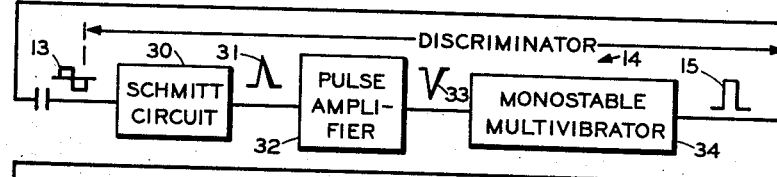
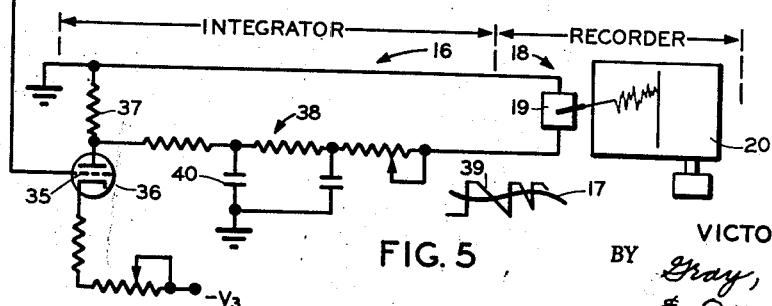
FIG. 5
INVENTOR.
VICTOR H. FISCHER
BY
ATTORNEYS

United States Patent Office 3,195,533
Patented July 20, 1965

3,195,533
DETECTING PHYSIOLOGICAL CONDITIONS BY MEASURING BIOELECTRIC OUTPUT FREQUENCY
Victor H. Fischer, Columbus, Ohio, assignor, by mesne assignments, to The Battelle Development Corporation, Columbus, Ohio, a corporation of Delaware
Filed Apr. 26, 1963, Ser. No. 275,907
5 Claims. (Cl. 128—2.1)

This invention relates to methods and apparatus for detecting physiological conditions in living human and animal bodies; as in their nervous systems. The invention is especially useful in detecting conditions in the human brain and in the human heart.

For convenience the detailed description herein is directed largely to a preferred embodiment of the invention and its use in detecting conditions in the human brain. The same apparatus and techniques are readily adapted to the detection of conditions in other parts of the bodies of living humans and animals.

The invention has been demonstrated to be superior to the prior art in detecting and recognizing such things as the response of the brain to traumatic damage, psychopharmaceuticals, natural sleep, and meaningful sound stimulation as compared to periods of quiet. It may also be used in similar manner for detecting and recognizing other physiological stress conditions such as the effects on the brain, heart, and other portions of the nervous system of oxygen, carbon dioxide, blood sugar, sensory deprivation, weightlessness, and high levels of imposed gravity stresses.

The invention includes methods and apparatus for detecting physiological conditions in living human and animal bodies by detecting bioelectric outputs from spaced locations in such a body, continuously measuring the instantaneous dominant frequency within a predetermined broad band of frequencies (that is, the average frequency or reciprocal of time duration between pulses) of each bioelectric output over an interval of time, and recording the measured frequency of each output as a continuous function of time. Preferably a plurality of electrodes are placed at spaced locations adjacent to the brain, heart, or another part of the nervous system (that is, in contact therewith, as with penetrating microelectrodes, or in close proximity thereto, as with scalp or chest electrodes). The bioelectric output between two said electrodes (ordinarily the difference in electrical potential present between the electrodes; comprising a measure of neuron potentials where the electrodes are connected adjacent to neurons) is continuously detected over an interval of time, and the instantaneous dominant frequency within a predetermined broad band of frequencies of the output is measured and recorded as a continuous function of time.

Typical apparatus according to the present invention for detecting physiological conditions in living human and animal bodies comprises means for detecting bioelectric outputs from spaced locations in such a body, amplifier means for increasing the amplitude of each bioelectric output, filter means for passing only the components of the amplified output that are within a predetermined range of frequencies, limiter means for controlling the peak amplitude of the amplified and filtered output, discriminator means for providing a pulse of substantially constant amplitude and duration for each reversal in the polarity of the output of the limiter means, integrator means for providing a signal having an amplitude proportional to the average direct current component of the train of pulses from the discriminator means, and means for recording the amplitude of the signal from the integrator means as a function of time.

In the drawings:

FIG. 1 is a side view of a human head. The spots show where the scalp electrodes are placed on the right side of the head for clinical electroencephalograph (EEG) examinations. The electrode positions are named for the areas of the brain from which electrical activity is recorded. The positions are duplicated on the left side of the head. The ground and vertex electrodes at the top of the head are located between the two hemipheres of the brain. Readings from the vertex are used as a reference.

FIG. 2 is a block diagram of a standard electroencephalograph (prior art), used for comparison purposes in connection with the present invention.

FIG. 3 is a block diagram of typical apparatus (herein called "Hyfreeg" as a shorter form of "Hyper-Frequency Electroencephalograph") employed in the present invention. A single-channel apparatus is shown for simplicity. Usually several channels, all substantially identical, are provided to record simultaneous events.

FIG. 4 comprises speciments of simultaneous Hyfreeg and EEG recordings. The EEG recording has been reduced and the Hyfreeg enlarged to equalize the time span represented by the two specimens. The Hyfreeg recording is from the right frontal (RF) electrode as is the top EEG tracing. The left anterior temporal (LAT) recording by the EEG is shown for comparison. The section between A and C in each tracing records a Petit Mal seizure. At B, the Hyfreeg shows a brief break in the seizure, which is much less noticeable on the EEG recording. Comparison of the two RF recordings shows how sharply the Hyfreeg registers changes in electrical activity as compared with the more rounded and steadier EEG tracings.

FIG. 5 is an electrical diagram, partly block and partly schematic, showing the apparatus of FIG. 3 in more detail.

The realization that physics and chemistry can be applied in physiological studies has led to greater knowledge of the human body during the last half century. The discovery of electrical activity in the brain by Caton in 1875 was the first of a series of studies that led to much of our present knowledge about the operation of the nervous system. Not that we clearly understand how the system really works. Quite otherwise. But by utilizing electrical currents, investigators of the nervous system are learning more about how signals are sent and received within the body.

Early studies by Beck and Von Marxow revealed the presence of electrical potentials in the visual cortex of dogs, when light was directed into their eyes. By the beginning of the 20th century the work of Cybulski, Kaufman, and others had demonstrated that electrical activity was indeed present in the brain and nervous system. Moreover, they were convinced that such activity was associated with functions other than sight. With the invention of the string galvanometer by Einthoven about 1906, better recording techniques became available, and by 1925 Neminski was able to record electrical activity from electrodes placed in the scalp and coined the word "electrocerebrogram" to describe the tracings he recorded.

Hans Berger, a German psychiatrist, built the first true electroencephalograph, the term which has come to be used for the device currently employed for recording the electrical activity of the brain and nervous system. Having experimented unsuccessfully with the string galvanometer as early as 1910, he continued to work on a more sensitive instrument, and by 1924 was able to demonstrate that the human brain has an electrical "beat" which varies with age, sensory stimulation, and other physio-chemical variations. Berger published 11 papers in the decade following 1929. These may be considered as establishing the instrument as the principal recording device for neurological studies. Additional studies in England and the United States supported the work already done by Berger.

The electroencephalograph has come to be an important tool for neurologists and psychiatrists. Over the years, they have learned how to interpret the varying signals that may be picked up from electrodes placed at certain positions over the brain. These positions have recognized names, and, as shown in the chart of the head, FIG. 1, include (in each case left and right) frontals, centrals, parietals, occipitals, temporals, midtemporals, and posterior temporals. The electrodes are, in fact, very fine needles, which are inserted into the scalp. One needle is placed in the center of the top of the head and is called the vertex. It serves as a reference for the readings from the other sites. Connections are also made at the ear lobes and at the ground lead behind the vertex; these serve as grounds for the system which is actually also grounded at the EEG.

A standard clinical EEG usually contains an 8-channel pen recorder, which produces a record in the form of wavy or jagged lines that represent changes in the electrical activity of different parts of the brain. Since there are 15 (including the vertex point) areas from which recordings may be taken, the needle electrodes are connected to the machine's bank of selector switches. This arrangement makes it possible for the operator to choose the areas from which recordings are to be made, and he can change the arrangement at any time.

The recorded lines vary in the shape and duration of the waves because of the changes in voltage produced at the electrodes by the brain. Over the years, as a result of numerous studies, certain patterns have come to be recognized as "normal" or to be associated with "normal" persons. Other patterns have come to be associated with tendencies to epileptic seizures and diseases that affect the health of the brain. Highly trained specialists, by studying the recorded lines, individually and in relationship, are able to learn the difficulties from which patients may be suffering. A normal clinical EEG examination usually requires from 200 to 400 feet of recording paper and may take hours to interpret.

Probably because of the history of the research on neural electrical activity, especially the fact that the first recordings were made at frequencies of 30 c.p.s. and less, modern clinical EEG's are not adapted to readings much above that figure. Rather, the EEG, much as AM (amplitude modulation), depends on changes in amplitude of a voltage rather than on frequency changes. Hence, if voltages are low (10 to 30 microvolts) and frequencies high (above 40 c.p.s.) there is a question as to how accurately the EEG can measure the brain's electrical activity. Undoubtedly the instrument's circuitry can integrate activity at the higher frequencies, but the recordings produced are likely to show voltages higher and frequencies lower than they actually are. Such integration is possibly misleading.

The need for a new approach to the study of the electrical activity in the nervous system was first recognized following investigation of the limitations of the existing equipment. The EEG is designed to measure amplitudes, yet there is evidence in the literature that frequencies undoubtedly play a most important role in the operation of the nervous system. Thus, a report of H. K. Hartline (Electrical Events in Vision, Scientific American, December 1956, pages 113–122) on the nerve potentials generated by the eye of a horseshoe crab showed that variations of light intensity upon the eye led to rising frequencies with growing light intensity, but the voltage remained constant. This was evidence that frequencies in the nervous system do not remain constant, but, indeed, might rise well above the 30 c.p.s. to which the EEG is essentially limited.

On the basis of evidence such as this, the following hypothesis was formulated: The entire central nervous system (brain and spinal cord) is basically frequency oriented. Putting it another way, the functions of information transfer, integration, and selection as performed by the sensory receptors, sensory (affector) nerve fibers, and motor (effector) nerve fibers are based on the frequencies or the pulse positions of the impulses which they carry. In terms of radio, the nervous system is postulated as operating much like an FM (frequency modulation) or a PPM (pulse position modulation) transmitter and receiver.

Since the existing EEG equipment is designed to operate on the AM principle, obviously, different equipment would be needed to test the hypothesis. On this basis, instrumentation to analyze frequency-oriented data from the nervous system was assembled. FIGS. 2 and 3 illustrate the nature of the instrumentation designed for the study. The new equipment was given the name Hyper Frequency EEG, which was shortened to Hyfreeg, the designation used herein.

The newly assembled equipment was put into operation at the Columbus State Hospital. The signals utilized by the Hyfreeg were taken from the EEG after four stages of amplification. Thus two simultaneous readings could be made from a subject and the Hyfreeg recordings could be directly compared with the data provided by the conventional EEG. Since the experimental Hyfreeg had only a single recording channel, measurements from each subject were recorded variously from the 14 points used in EEG recordings (FIG. 1). The electrical activity as recorded by the Hyfreeg from each area was referenced to the vertex electrode.

Following normal EEG procedure, the subject reclined, and his eyes were covered by cotton pads held by tape during examination. Recording was not begun until the subject was completely relaxed. In at least one instance a subject went to sleep during the recording session. To make certain that the state of the subject had not changed, he was checked during and after Hyfreeg recording from each area.

Over a period of about three months, studies were made of 100 patients of the Columbus State Hospital. In each case, as pointed out above, the signals utilized in the Hyfreeg equipment were taken from the institution's EEG. Thus parallel records from the two machines were available for all patients, making cross checking of the recordings possible.

It was impossible in this period to make exhaustive analyses of the recordings. The observations that follow are based upon only the most apparent results. But these indicate certain striking advantages. Moreover, the type of data provided extend so far beyond that to be gained from EEG recordings that Hyfreeg seems to open up new vistas of neurological research. The data provided by the tests were checked against the subject's hospital records, but only after the recording had been completed.

Early in the study, it became evident that the frequencies of the hemispheres of the brain, as measured at the parietal electrodes, were likely to vary considerably. The recordings also revealed that the frequencies registered at different locations on the brain varied. But, in the average subject, the frequencies at all electrodes attached over one hemisphere reflected the dominant or inferior frequency reading revealed by the parietal electrodes. Aftre a number of recordings the strength of this pattern was unmistakable.

The higher frequencies were accepted as identifying the dominant areas of activities, and after all the recordings were completed, following that interpretation, 97 subjects were found to have dominant left hemispheres. A check of the subjects' records revealed that 92 of the subjects were righthanded. Three of the lefthanded subjects showed higher activity at the right parietal. The remaining five lefthanders showed dominant activity at the left parietal. In no case was equal activity observed in the parietals. It is generally accepted in clinical neurology that approximately 50 percent of lefthanded persons have a left dominant hemisphere.

*Table*

CHANGES IN FREQUENCY ACCOMPANYING SLEEP

| Electrode Location | Hyfreeg Recordings in Cycles per Second | | Net Change |
|---|---|---|---|
| | Awake | Asleep | |
| Left Frontal | | | 0 |
| Right Frontal | | | 0 |
| Left Central | | | 0 |
| Right Central | 90 | 60 | 30 |
| Left Parietal | | | 0 |
| Right Parietal | | | 0 |
| Left Occipital | 110 | 90 | 20 |
| Right Occipital | 70 | 50 | 20 |
| Left Anterior Temporal | 90 | 70 | 20 |
| Right Anterior Temporal | 120 | 90 | 30 |
| Left Temporal | | | 0 |
| Right Temporal | | | 0 |
| Left Posterior Temporal | 100 | 70 | 30 |
| Right Posterior Temporal | 120 | 90 | 30 |
| | 120 | 80 | 40 |

In one case, observations were made upon a subject both in the sleeping and waking state in the course of a single examination. The patient's eyes were covered by eye pads, held in place by tape during the entire examination. As shown in the table above, no significant changes in the sleeping state as compared with the waking state were noted in the left and right frontals and parietals, and in the left central and left midtemporal areas. Other areas, however, showed declines of 20 to 40 c.p.s. It is obvious from the readings that decreases in frequencies during sleep occurred primarily in the temporal and occipital areas.

It is interesting to note, in this connection, the method of electrically inducing sleep reported by V. A. Gilyarovsky of the U.S.S.R. in his book Electrosleep (A Clinical Physiological Investigation), Medgiz—Moscow (1948). The equipment he used produced low-voltage pulses which he reported as being of frequencies up to 80 c.p.s. The current was applied bilaterally to occipital areas and the eyeballs. According to the Soviet scientist he most frequently used the range from 60 to 70 c.p.s. There is a close correlation between Gilyarovsky's frequencies and the frequencies measured in the occipital areas by the Hyrfeeg equipment during spontaneous sleep.

In the studies that followed the examinations of the subjects, some unusual and illuminating correlations between Hyfreeg readings and hospital records were discovered. For example, a remarkable relationship is apparent between readings from the anterior temporal areas and the rationality and judgment patterns of subjects. The basic pattern of these relationships, assuming the left as the dominant hemisphere, can be characterized by the following statements:

(a) If the left anterior temporal was dominant over the right anterior temporal, the subject usually possessed rational thought or good judgment.

(b) If the frequencies recorded for the left anterior temporal and right anterior temporal were the same, the subject was likely to be irrational and/or confused occasionally.

(c) If the right anterior temporal area showed a higher frequency reading than that of the left anterior temporal area, the subject was likely to be irrational or confused most of the time.

The Hyfreeg recordings of the 100 patients, after the examinations, were classified into three major groupings: higher anterior temporal readings in the dominant side as indicated by the parietal reading; anterior temporal readings that were equal for both hemispheres; higher frequency in the anterior temporal on the nondominant side as determined by the parietal readings. The hospital's information on each subject was then compared with the above readings as recorded on the Hyfreeg. All but seven of the patients, or 93 percent, showed precise correlation between the records and thought and judgment patterns predicted from the recordings.

Another interesting pattern emerged in connection with the recordings from the posterior temporal area as compared with the anterior temporal area, both in the dominant hemisphere. Differences in readings of these areas appear to relate to the passive-aggressive nature of the subject. The characteristic patterns that emerged after the study of the recordings are described below on the basis of the left as the dominant hemisphere. If the right hemisphere were dominant, the relationships between hemispheres would be reversed.

(I) If the left anterior temporal showed a higher frequency than the left posterior temporal, subjects showed highly developed inhibitions, were withdrawn, passive, and at times, mentally depressed.

(II) If frequencies of the left anterior temporal and left posterior temporal areas were equal, the subject was usually aggressive, sometimes moody, occasionally deeply depressed and withdrawn, and was predisposed to have temper tantrums. Moreover, he would cycle between the extremes.

(III) If the higher frequency was recorded in the left posterior temporal, as compared with the left anterior temporal, the subject would be outgoing and tend to be physically aggressive. If a subject, in addition to these frequency readings, was also disoriented as to rationality, his aggressiveness would take the form of physical assault or destruction of property.

When the hospital records of the subjects were compared with their Hyfreeg recordings, 89 percent correlated exactly as predicted from the recorded activities. In this connection, it is worthy of note that the findings relating to the recordings from the temporal areas seem to support the conclusions of Dr. J. W. Papez, a late staff member of the Columbus State Hospital. In his famous paper on "Mechanisms of Emotions", Archives of Neurology and Psychiatry, 38:725 (1937), Papez noted that emotional reactions appear to be related to the deep structures of the temporal lobes of the brain.

One unusually illuminating recording, FIG. 4, included that of a Petit Mal seizure. At the point A marked on the EEG by the classical Petit Mal pattern, the Hyfreeg recording showed a drop in primary activity to a very low level, precisely with the onset of the seizure. At the midpoint B of the Petit Mal pattern, the Hyfreeg showed a rise in frequency probably signaling a brief break in the seizure. The EEG also showed a brief change in the wave form, but appeared unable to respond as quickly as the Hyfreeg. This suggests that the Hyfreeg technique is capable of measuring primary activity.

Still other observations have been made from the Hyfreeg recordings. For example, activity of 40 c.p.s. or less appeared to correlate with the clinical indications of seizure proneness. Also, patients diagnosed by EEG, neurological, and psychometric examinations as having organic damage in the brain area, when analyzed from Hyfreeg recordings showed a significant decrease in primary "carrier" activity. Examinations of more subjects and more intense study of the recordings, which are continuing, will undoubtedly lead to other significant indications of value in the study of seizures, neurological damage, and emotional patterns of patients.

To attempt to describe current theories of how the nervous system operates would be very difficult. Actually there seem to be no complete coherent theories that will explain many of the phenomena that have been observed. Indeed, a study of current literature reveals a good deal of confusion and almost no integrated views about how the neural mechanisms are related. Perhaps the one point on which most students of neurology agree is that electrically the nervous system is amplitude oriented.

In the present study of the operation of the Hyfreeg and of the recordings made with it, it has become evident that the basic hypothesis that led to the development of the equipment—that the central nervous system is frequency oriented—is an important key to understanding how that system operates. Canvassing various unexplained aspects of the nervous system has further developed the fact that the tentative theory supplies reasonable and logical explanations for them.

The following discussion reviews some of the evidence supporting the tentative theory and indicates how it appears to explain certain mechanisms in a logical fashion.

The evidence reported above demonstrates the validity of the Hyfreeg recordings, so far as the EEG was able to substantiate them. Moreover, the high correlation between the data provided by Hyfreeg and the hospital's records indicates that the frequency-oriented theory can provide data which even the clinical EEG cannot approach. Even with the relatively small sample of 100 examinations, correct identification of rationality or irrationality in 93 percent of the subjects, of passivity or aggressiveness in 89 percent of the subjects, and of 100 percent of righthanded subjects indicates EEG-type of data never before available. And the difference between the two types of recording equipment is primarily that of the EEG's recording of amplitude and the Hyfreeg's recording of changes in frequency or pulse positions.

Evidence that the central nervous system may be frequency controlled can be cited from the reports of workers in the field. Hartline, already mentioned, and others have demonstrated that nerve-impulse activity in a single sensory nerve fiber increases in frequency with the increase of the applied stimulus. This relationship between frequency of activity and intensity of stimulation probably is the primary method of information transmission within the central nervous system.

Hartline's experiments, for example, demonstrated that sensory receptors of the eyes are specifically tuned, and therefore sensitive, to a very narrow band of light wavelengths. Indeed, the information transmitted by the receptor was shown by Hartline to be related only to the intensity of the light stimulus within its specific band width.

Based on this theory, the operation of a receptor in the eye and its related nerve structure may be described as follows:

A blue light of constant intensity activates a blue-light-sensitive receptor in the eye. The receptor then responds by producing a specific pulse signal (say 60 pulses per second) in its nerve fiber. The signal moves along the fiber, at a constant frequency, to its terminal at a junction or synapse in a group of second-order neurons (nerve cells). One or possibly more of the latter, in turn, is tuned to respond to the same frequency of 60 pulses per second. Only fibers so tuned will pass on the signal.

We theorize this to be the method by which information is selectively transmitted within the central nervous system. Once the selection has been established, the specific information can be easily integrated and brought into relationship with the areas of higher mental activity. The same process as described analogously with respect to sight, will also apply to other special senses, such as smell, taste, and hearing.

This theory provides a logical role for the acetylcholine mechanism, which is found in the neuro-neural junctions. Its function appears to be that of a mediator such as an electrolyte and controller for impulse transmission. As a controller of impulse activity its function is probably that of a suppressor or inhibitor. This function may be found in the phenomenon known as "accommodation." This refers to gradual decrease in amplitude of a signal from a receptor which is subject to a stimulus of constant intensity. The frequency of the signal remains constant until the amplitude drops below the threshold level of the neuro-neural and the signal stops. The person experiences the phenomenon as a fading of awareness of the stimulus.

A possible explanation of the eventuality is the exhaustion of the acetylcholine's conductive properties by some means.

The theory of the transferral of information by frequency may also be related to the simple spinal reflex. For example, when a somato-sensory receptor has been stimulated (by heat, for instance), the frequency of the resulting pulse signal would be related to the intensity of the stimulus. Such information is transmitted to the posterior horn of the spinal cord where the fiber divides, one branch synapsing in the same level of the spinal cord, the other ascending to the brain. If the frequency level of a signal is greater than an established critical level, the internuncial neuron will respond, passing on the signal at the same frequency to the motor neuron in the anterior horn. The anterior horn, in turn, sends the signal (still in the same frequency) to the motor unit, which produces a muscle contraction in the form of a jerk. Such a mechanism would explain the speed with which parts of the body can react to the intense stimulus. Of course, if the stimulus is of a low enough order to induce a signal with a frequency below the critical level, the internuncial neurons do not respond. The information then, is transmitted only to the higher nerve centers.

In the examples cited above, situations involving stimuli of constant intensity where used which would result in constant impulse frequency. In life, such situations seldom occur. Therefore, a typical signal would be expected to be at frequencies that would vary with time. The latter situation is analogous to the principle of frequency or pulse position modulations.

This "frequency modulation" theory appears to clarify many previously observed aspects of information transfer that earlier theories of the operation of the nervous system did not explain. The key to the whole system, as postulated in this theory, is the frequency or pulse position specificity of the neuron within the nervous system. The frequency-specificity of the neuron, in turn, relates naturally to the already recognized sensory modality specificity of the sensory receptors. It is believed that the Hyfreeg method of recording cerebral activity is directly oriented to the neuro-physiologic processes because those processes are frequency oriented.

Referring now to FIGS. 2, 3, and 5, typical single-channel apparatus according to this invention for detecting physiological conditions includes means such as the electrodes connected to the scalp of the patient in FIG. 2 for detecting bioelectric outputs from spaced locations in a human or animal body connected, as through the electrode junction box and electrode selector switch bank of FIG. 2, to an amplifier 10 for increasing the amplitude of each bioelectric output. The output of the amplifier 10 is connected to a band pass filter 11 which passes only the components of the amplified output that are within a predetermined range of frequencies. The output of the band pass filter 11 is substantially a sine wave as shown at 22 in FIG. 5. A typical useful range of frequencies for measurement on the human brain is from 20 to 150 cycles per second.

A limiter 12 controls the peak amplitude of the amplified and filtered output, as is indicated by the wave form shown at 13 in FIG. 5. A discriminator 14 provides a pulse of substantially constant amplitude and duration as is indicated at 15 for each reversal in the polarity of the output 13 of the limiter 12. An integrator 16 provides a signal having an amplitude proportional to the average direct current component (as is indicated by the wave shape at 17) of the train of pulses 15 from the discriminator 14. A recorder 18, comprising a pen controlling motor 19 and associated recording paper and paper driving motor 20, records the amplitude of the signal 17 from the integrator 16 as a function of time.

For recording potentials at a plurality of locations simultaneously, the apparatus of FIG. 3 is merely duplicated for each potential to be recorded.

Referring to FIG. 5, the limiter 12, the discriminator 14, and the integrator 16 may comprise any suitable circuits, conventional or otherwise, for providing the desired functions. A typical limiter 12 has a limiting input circuit comprising a pair of shunt diodes 23 and 24. The diodes 23, 24 are biased to limit the signals 22 from the band pass filter 11 to a desired peak-to-peak amplitude sufficient to drive the amplifier 25 from saturation to cutoff. The output of the amplifier 25, an amplified replica of the input signal near its zero crossings, as is indicated by the wave shape 26, feeds a second limiting circuit, comprising a pair of shunt diodes 27 and 28, which clips any excessive signals. The clipped signals are fed to the amplifier 29, which provides a square wave output as is indicated at 13. The square wave 13 reverses polarity at the same time (aside from the negligible constant time for current to travel in a circuit) that the input signal 22 reverses its polarity.

The output 13 of the amplifier 29 is fed to a Schmitt circuit 30, also commonly called a cathode coupled binary circuit, which provides a sharp positive output pulse 31 for each positive-going zero crossing of the input square wave signal 13. The positive pulse 31 is amplified and inverted by the pulse amplifier 32. The output 33 of the pulse amplifier 32 is applied to a monostable multivibrator 34, which provides an output pulse 15 of constant amplitude and duration for each input pulse 33.

The output pulse 15 of the monostable multivibrator 34 is applied to the grid 35 of a triode tube 36 in the integrator 16. The tube 36 conducts current for precisely the duration of the pulse 15, producing a voltage across the plate load resistor 37. This voltage is connected through the resistance-capacitance filter circuit 38 to the pen motor 19 of the recorder 18. The wave shape 39 represents the voltage across the capacitor 40 of the filter circuit 38. The wave shape 17 represents the filtered voltage applied to the pen motor 19, which corresponds to the average voltage across (and the average current through) the plate load resistor 37. The average voltage 17 is directly proportional to the number of input pulses 15 applied per second to the grid 35 of the triode tube 36, and thus to the input frequency. The pen motor 19 provides a graphic record of the average voltage 17 on the moving paper of the recorder 18, and thus provides a record of the frequency of the pulses 15 and of the fundamental frequency of the input wave 22 of the band pass filter 11 as a function of time.

It is realized that various modifications of the invention may be made without departing from the spirit and scope thereof and without the exercise of further invention. No attempt is made here to list all such possibilities. It is to be understood that the words used herein are terms of description rather than of limitation, and that various changes may be made without departing from the spirit or scope of the invention.

What is claimed is:

1. A method of detecting conditions in the brain, heart, and other regions in the nervous systems of humans and animals comprising the steps of placing a plurality of electrodes at spaced locations adjacent to such a nervous system, continuously detecting the difference in electrical potential present between two said electrodes over an interval of time, continuously measuring the instantaneous dominant frequency within a predetermined broad band of frequencies of said potential difference during said interval, and recording the measured frequency as a continuous function of time.

2. A method of detecting physiological conditions in the brain, heart, and other regions in living human and animal bodies comprising the steps of placing a plurality of electrodes at spaced locations in such a body, continuously detecting the bioelectric output between two said electrodes over an interval of time, continuously measuring the instantaneous dominant frequency within a predetermined broad band of frequencies of said output during said interval, and recording the measured frequency as a continuous function of time.

3. A method of detecting conditions in the brain, heart, and other regions in the nervous systems of humans and animals comprising the steps of continuously measuring neuron potentials adjacent to such a nervous system over an interval of time, continuously measuring the instantaneous dominant frequency within a predetermined broad band of frequencies of said neuron potentials during said interval, and recording the measured frequency as a continuous function of time.

4. Apparatus for detecting physiological conditions in living human and animal bodies comprising means for detecting bioelectric outputs from spaced locations in such a body, means for continuously measuring the instantaneous dominant frequency within a predetermined broad band of frequencies of each said bioelectric output over an interval of time, and means for recording the measured frequency of each said output as a continuous function of time.

5. Apparatus for detecting physiological conditions in living human and animal bodies comprising means for detecting bioelectric outputs from spaced locations in such a body, amplifier means for increasing the amplitude of each said bioelectric output, filter means for passing only the components of the amplified output that are within a predetermined range of frequencies, limiter means for controlling the peak amplitude of the amplified and filtered output, discriminator means for providing a pulse of substantially constant amplitude and duration for each reversal in the polarity of the output of said limiter means, integrator means for providing a signal having an amplitude proportional to the average direct current component of the train of pulses from said discriminator means, and means for recording the amplitude of the signal from said integrator means as a function of time.

References Cited by the Examiner

UNITED STATES PATENTS

| | | | |
|---|---|---|---|
| 2,648,822 | 8/53 | Walter | 128—2.16 |
| 2,860,627 | 11/58 | Harden | 128—2.16 |
| 3,123,768 | 3/64 | Burch | 128—2.16 |

OTHER REFERENCES

Davis: pages 29–34 of IRE Transactions of Medical Electronics of July 1958.

RICHARD A. GAUDET, *Primary Examiner.*

L. R. PRINCE, *Examiner.*

Dedication 3,195,533.—*Victor H. Fischer*, Columbus, Ohio. DETECTING PHYSIOLOGICAL CONDITIONS BY MEASURING BIOELECTRIC OUTPUT FREQUENCY. Patent dated July 20, 1965. Dedication filed May 7, 1973, by the assignee, *The Battelle Development Corporation*.

Hereby dedicates to the People of the United States the entire remaining term of said patent.

[*Official Gazette October 23, 1973.*]